US012695616B2

(12) United States Patent
Roper

(10) Patent No.: US 12,695,616 B2
(45) Date of Patent: Jul. 28, 2026

(54) NON-FUNGIBLE TOKENS FOR VIRTUAL ACCESSORIES DURING VIRTUAL MEETINGS

(71) Applicant: Zoom Video Communications, Inc., San Jose, CA (US)

(72) Inventor: Brandon Kevin Roper, Washington, UT (US)

(73) Assignee: Zoom Communications, Inc., San Jose, CA (US)

( * ) Notice: Subject to any disclaimer, the term of this patent is extended or adjusted under 35 U.S.C. 154(b) by 77 days.

(21) Appl. No.: 17/866,107

(22) Filed: Jul. 15, 2022

(65) Prior Publication Data

US 2024/0022409 A1 Jan. 18, 2024

(51) Int. Cl.
*H04L 29/06* (2006.01)
*H04L 9/00* (2022.01)
(Continued)

(52) U.S. Cl.
CPC .............. *H04L 9/3213* (2013.01); *H04L 9/50* (2022.05); *H04N 7/157* (2013.01)

(58) Field of Classification Search
CPC ..... H04L 9/3213; H04L 9/50; H04L 2209/60; H04L 41/0897; H04L 41/342; H04L 45/76; H04L 9/3228; H04L 9/3234; H04L 12/417; H04L 47/527; H04L 2012/6451; H04N 7/157; H04N 7/15; H04N 13/111; (Continued)

(56) References Cited

U.S. PATENT DOCUMENTS 10,263,832 B1 * 4/2019 Ghosh ................ H04L 43/0823
11,508,345 B1 11/2022 Mclafferty
(Continued)

FOREIGN PATENT DOCUMENTS

KR 20230109037 A 7/2023
KR 20240078156 A 6/2024

OTHER PUBLICATIONS

U.S. Appl. No. 17/866,096, "Final Office Action", Nov. 14, 2025, 26 pages.
(Continued)

*Primary Examiner* — Edward Zee
*Assistant Examiner* — Leynna Truvan
(74) *Attorney, Agent, or Firm* — Kilpatrick Townsend & Stockton LLP

(57) ABSTRACT

Systems and methods for providing non-fungible tokens (NFTs) for virtual accessories during virtual meetings are provided herein. The system may include a non-transitory computer-readable medium; a communications interface; and a processor communicatively coupled to the non-transitory computer-readable medium and the communications interface. The processor may be configured to execute processor-executable instructions stored in the non-transitory computer-readable medium to: receive, from a first client device, a request to use a virtual accessory during a virtual meeting; determine a NFT associated with the virtual accessory; determine, based on the NFT, whether the first client device is authorized to use the virtual accessory; and transmit, to the first client device, a response based on whether the first client device is authorized to use the virtual accessory.

20 Claims, 12 Drawing Sheets

(51) Int. Cl.
  *H04L 9/32* (2006.01)
  *H04N 7/15* (2006.01)

(58) Field of Classification Search
  CPC .......... G01R 19/2516; G01V 2210/125; G05B 2219/32246; G05B 2219/35338; G05B 2219/39014; G05B 2219/40121; G05B 2219/40122; G05B 2219/40131; G06F 1/1673; G06F 3/0428; G06F 9/45533; G06F 11/0712; G06F 12/145; G06F 13/37; G06F 2212/178; G11B 19/025; G11B 20/00811; H04M 15/79; H04M 1/6058

See application file for complete search history.

(56) References Cited

U.S. PATENT DOCUMENTS

| | | | |
|---|---|---|---|
| 11,652,959 B2 * | 5/2023 | Oz ........................... | G06N 3/08 |
| | | | 345/419 |
| 11,687,628 B2 | 6/2023 | Goldston et al. | |
| 12,406,250 B2 | 9/2025 | Mistele | |
| 2011/0185286 A1 | 7/2011 | Moyers et al. | |
| 2013/0250087 A1 * | 9/2013 | Smith ..................... | G06F 3/013 |
| | | | 348/78 |
| 2017/0344988 A1 | 11/2017 | Cusden et al. | |
| 2018/0335930 A1 | 11/2018 | Scapel et al. | |
| 2018/0336715 A1 | 11/2018 | Rickwald et al. | |
| 2020/0005284 A1 | 1/2020 | Vijayan | |
| 2020/0092106 A1 | 3/2020 | Leong | |
| 2021/0256070 A1 | 8/2021 | Tran et al. | |
| 2022/0198034 A1 | 6/2022 | Rodriguez | |
| 2022/0239485 A1 * | 7/2022 | Irwin, Jr. .................. | G06T 7/20 |
| 2022/0284428 A1 | 9/2022 | Zhou et al. | |
| 2022/0357905 A1 * | 11/2022 | Dohmae ............... | G06F 3/1203 |
| 2022/0414621 A1 * | 12/2022 | Parlotto .................. | G06F 21/64 |
| 2023/0009304 A1 | 1/2023 | Jakobsson et al. | |
| 2023/0050546 A1 | 2/2023 | Wang et al. | |
| 2023/0070586 A1 | 3/2023 | Kapur et al. | |
| 2023/0085677 A1 | 3/2023 | Copeland et al. | |
| 2023/0090253 A1 | 3/2023 | Meadows et al. | |
| 2023/0117399 A1 | 4/2023 | Jakobsson et al. | |
| 2023/0130182 A1 | 4/2023 | Mir et al. | |
| 2023/0245350 A1 | 8/2023 | Webber et al. | |
| 2023/0281915 A1 | 9/2023 | Dhaliwal et al. | |
| 2023/0359604 A1 | 11/2023 | Doney | |
| 2024/0022408 A1 | 1/2024 | Roper | |
| 2024/0022793 A1 | 1/2024 | Silverstein et al. | |

OTHER PUBLICATIONS

U.S. Appl. No. 17/866,096, "Non-Provisional Application", filed Jul. 15, 2022, 73 pages.

U.S. Appl. No. 17/866,096, "Non-Final Office Action", Apr. 3, 2025, 19 pages.

* cited by examiner

500 —

Virtual Accessory Registration Settings  — 505

*Please select which participants can use your virtual accessory?*

|  | Yes | No | Yes, until |
|---|---|---|---|
| All Participants | ◯ | ◯ | Date/Time |
| Participants within Organization | ◯ | ◯ | Date/Time |
| Participants Outside Organization | ◯ | ◯ | Date/Time |
| Participants Outside Meeting List | ◯ | ◯ | Date/Time |
| Type Name | ◯ | ◯ | Date/Time |

510

515

520

Apply

525

800

RECEIVE A REQUEST TO REGISTER A VIRTUAL ACCESSORY — 805

DETERMINE A NFT ASSOCIATED WITH THE VIRTUAL ACCESSORY — 810

REGISTER THE VIRTUAL ACCESSORY WITHIN A NFT REGISTRY — 815

TRANSMIT THE NFT ASSOCIATED WITH THE VIRTUAL ACCESSORY — 820

900

RECEIVE A REQUEST TO USE A VIRTUAL ACCESSORY — 905

DETERMINE A NFT ASSOCIATED WITH THE VIRTUAL ACCESSORY — 910

DETERMINE WHETHER THE FIRST CLIENT DEVICE IS AUTHORIZED TO USE THE VIRTUAL ACCESSORY — 915

TRANSMIT A RESPONSE BASED ON WHETHER THE FIRST CLIENT DEVICE IS AUTHORIZED TO USE THE VIRTUAL ACCESSORY — 920

NON-FUNGIBLE TOKENS FOR VIRTUAL ACCESSORIES DURING VIRTUAL MEETINGS

FIELD

The present application generally relates to videoconferences and more particularly relates to systems and methods for providing non-fungible tokens (NFTs) for virtual accessories during virtual meetings.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
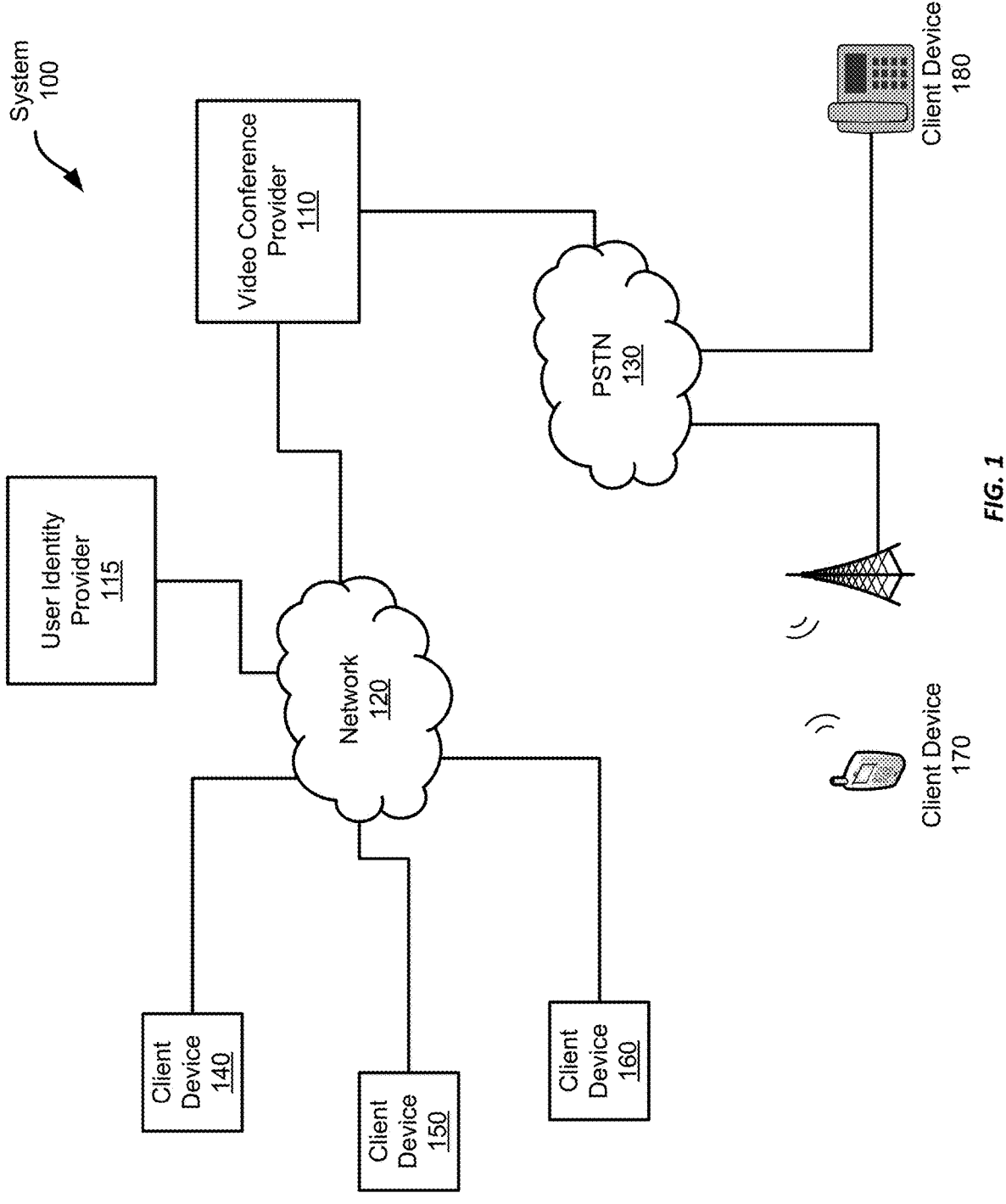
FIGS. 1, 2, and 3 show example systems for providing NFTs for virtual accessories during a virtual meeting, according to an embodiment herein.

Examples are described herein in the context of systems and methods for providing NFTs for virtual accessories during a virtual meeting. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Video conference providers can enable people to interact with each other using their own computers (or "client devices") with both video and audio in a variety of settings, such as in one-on-one conversations, group meetings, and webinars. While each of these types of settings can allow people to interact with each other, they can differ in character. For example, one-on-one conversations include only two people and may involve only a small amount of data being transmitted between the two client devices. Group meetings may involve a larger number of people all interacting with each other. In contrast, webinars typically involve a group of people that are attending to hear presentations from one or more presenters. Thus, in a webinar, interaction tends to be mostly one-way: from the presenter(s) to the audience. In addition, webinars can have very large numbers of participants, potentially numbering in the thousands or tens of thousands.

As the popularity of virtual meetings to replace conventional, in-person meetings, continues to rise, so too does the desire to add a personal flair to the virtual meeting. During conventional meetings, meeting participants are able to express themselves by the clothes, shoes, and other accessories that they wear. During virtual meetings, however, a participant's outfit, shoes, and other accessories are often not visible on the video stream. Moreover, as interactions between participants shift into the virtual space, so too does a participant's desire to express themselves within the virtual space.

Virtual accessories provide meeting participants the ability to personalize their virtual spaces during a meeting. Virtual accessories include virtual backgrounds (including static, animated, movie backgrounds), filters, avatars, and the like. While video conference providers can provide standard virtual accessories, many participants often desire to customize or personalize their virtual accessories. Virtual accessories to some participants are the equivalent of a statement piece, such as a nice watch or necklace. A virtual accessory can provide a participant the ability to express his or her personality and bring personal flair to a virtual meeting.

An issue arises, however, in the non-exclusivity of virtual accessories within the virtual space. Currently, if a participant creates a custom virtual accessory any other participant can copy the custom virtual accessory and use it. Since the custom virtual accessory derives its worth to the participant from being novel and unique to the creating participant, when other participants start using the custom virtual accessory the custom virtual accessory is no longer a personal expression of the creating participant.

In another example, organizations or companies may give exclusive virtual accessories to meeting participants as digital trophies, such as giving a top earning employee a virtual background indicating the employee as a top earner. If other employees can copy the top earning virtual background, then the digital trophy has little meaning to the receiving employee.

To provide exclusivity for personalized virtual accessories, systems and methods for providing non-fungible tokens (NFTs) for virtual accessories during virtual meetings are provided herein. As described herein, a participant who creates a personal virtual accessory can register the virtual accessory with the video conference provider. In some embodiments, the virtual accessory may be associated with a NFT and both the virtual accessory and the NFT may be registered with the video conference provider. In some embodiments, the NFT may be registered within a blockchain associated with the NFT registry. The NFT may be associated with a specific meeting participant account and be used by the participant during a virtual meeting to use the virtual accessory. If another participant tries to use the same virtual accessory, the video conference provider may determine a NFT associated with the virtual accessory and deny the non-registered participant from using the virtual accessory.

In another embodiment, if another participant tries to register a virtual accessory that is substantially similar to a registered virtual accessory, the video conference provider may deny the registry request. For example, the video conference provider may analyze the requesting virtual accessory for one or more identifiers and then compare the identifiers to a NFT registry of virtual accessories. If the requesting virtual accessory has a number of identifiers over a threshold that are similar to a virtual accessory in the NFT registry, then the video conference provider may deny the registration request.

This illustrative example is given to introduce the reader to the general subject matter discussed herein and the disclosure is not limited to this example. The following sections describe various additional non-limiting examples and examples of systems and methods for providing NFTs for virtual accessories during virtual meetings.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
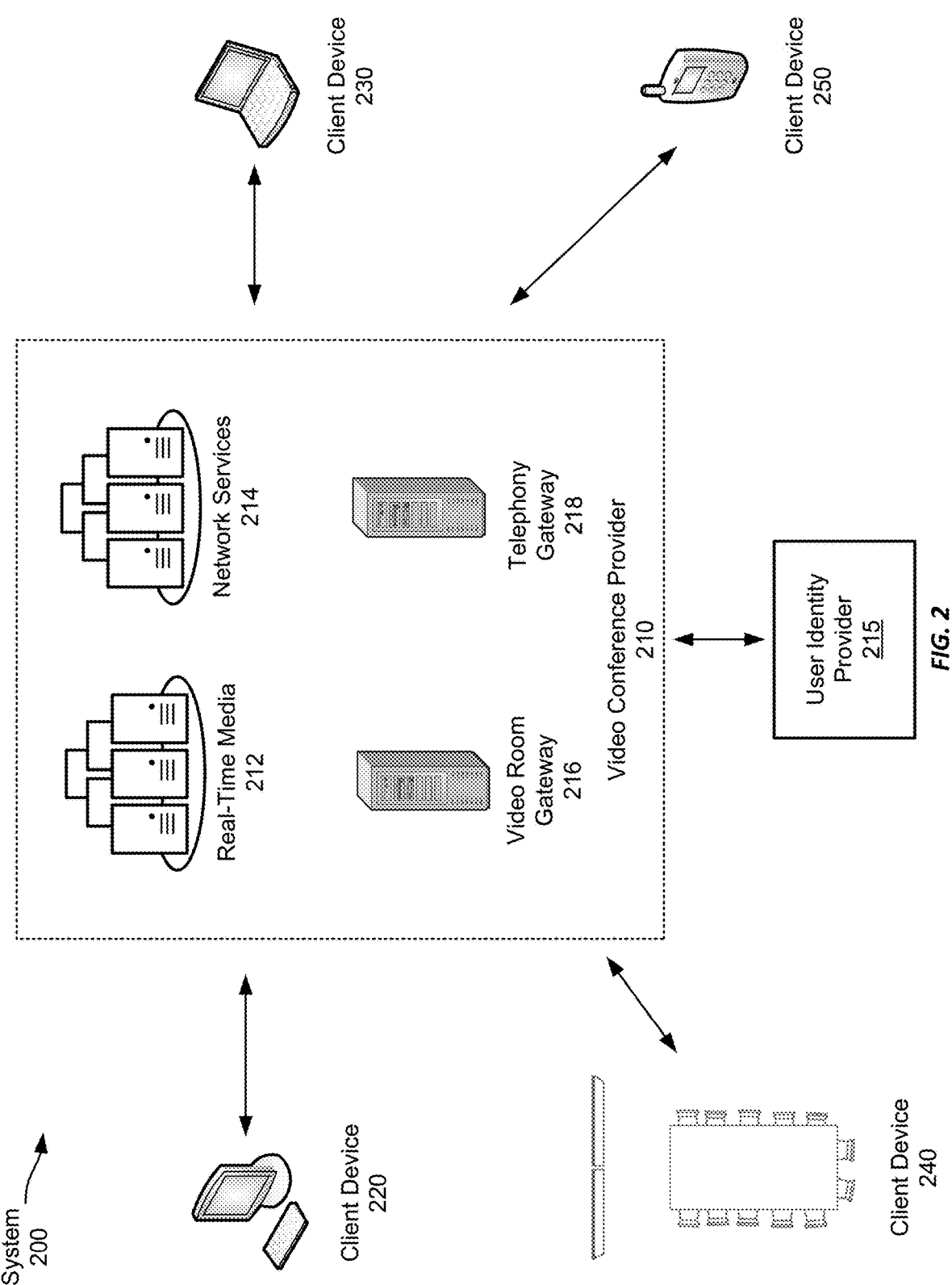

Video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, users may be admitted immediately upon providing the appropriate meeting identifier (and authentication information, as appropriate), even if the host has not yet arrived, or the users may be presented with information indicating that the meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can making conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider

115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different Examples of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
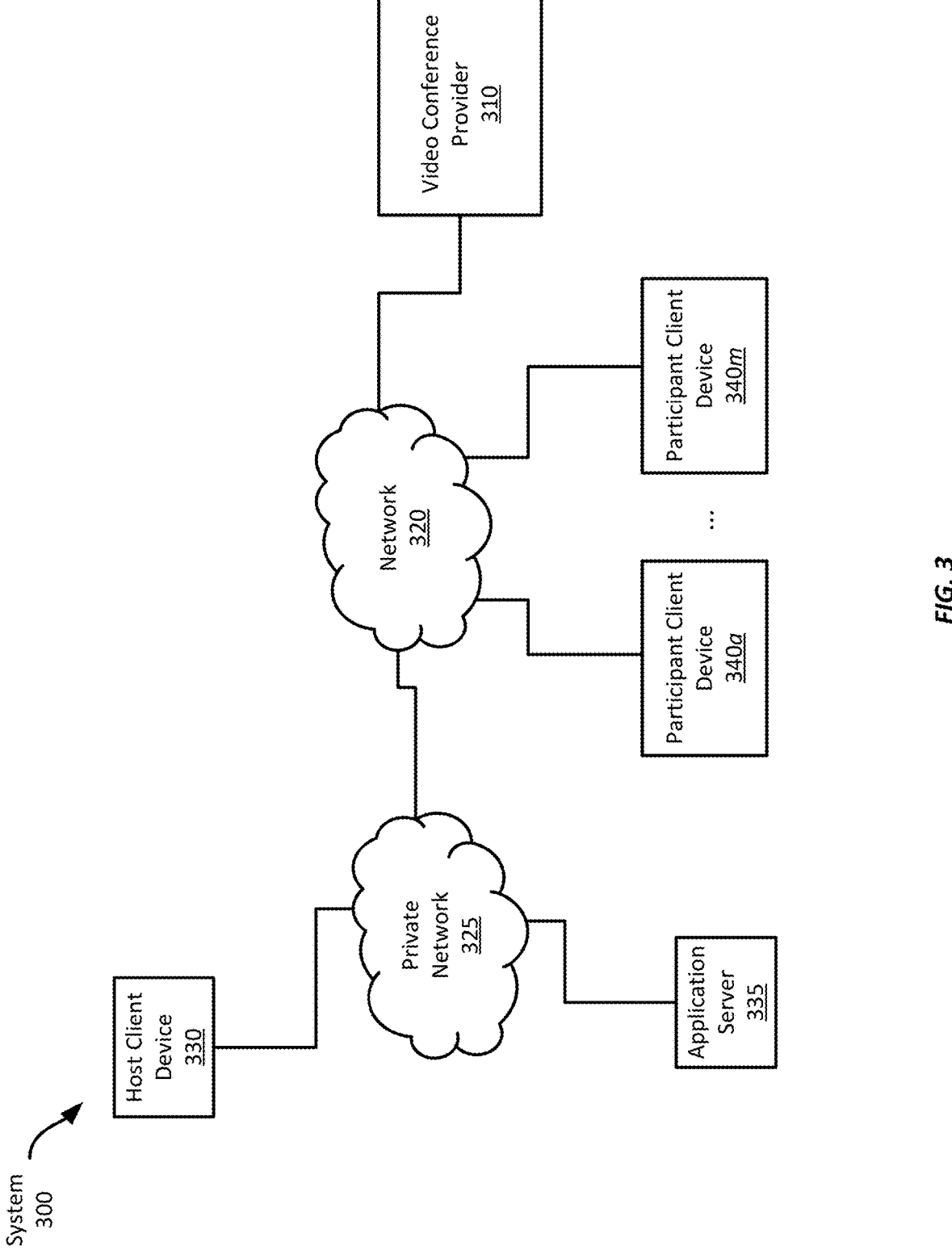

Referring now to FIG. 3, FIG. 3 shows an example system 300 for providing NFTs for virtual accessories during a virtual meeting. In this example, a video conference provider 310 provides video conference services to multiple different client devices 330 and 340a-m, generally as described above with respect to FIGS. 1 and 2. In this example, the client devices 330 and 340a-m participate in a meeting hosted by the video conference provider 310. Client devices 340a-m connect to the video conference provider 310 over a public network 320, e.g., the internet; however, host client device 330 participates from within a private network 325, such as from their office at work. In addition to the host client device 330, an application server 335 is connected to the private network and makes various business applications available to the host client device 330. In different examples, these business applications may vary; however, in this example, the application server 335 provides applications to access business databases and files. To access these various resources, the host client device 330 has different client applications installed on it and may also have web applications accessible via a web browser, which may be stored as bookmarks in the web browser.

To start a meeting, the host client device 330 connects to the video conference provider 310 and begins a virtual meeting ("meeting") at the video conference provider 310, such as by beginning a scheduled meeting, generally as described above with respect to FIGS. 1 and 2. The video conference provider 310 may create and manage the meeting as discussed above.

Once the virtual meeting is started, participants may be able to interact with other participants and see their respective names, such as in close proximity to other participants' video streams or in a list of participants visible in a graphical user interface ("GUI"). In some embodiments, the participants may only be able to see information, e.g., names or video feeds, from the host(s) of the meeting or certain select participants that will be engaged in discussions during the virtual meeting, such as panelists in a panel discussion. Still other limits may be imposed on the various participants, such as their ability to react to occurrences during the meeting, e.g., participants may be allowed to interact with their GUI to raise their hand to ask a question, but may not be allowed to provide any other feedback.

Prior to or during the meeting, a participant associated with the participant client device 340a may generate a personalized virtual accessory. For example, the participant associated with the participant client device 340a may create a custom virtual background. When the participant client device 340a requests to join the virtual meeting, the participant client device 340a may request to use the virtual background during the meeting. If the virtual background is registered with the video conference provider 310, then the participant client device 340a may have stored thereon a NFT associated with the virtual background. When requesting to use the virtual background, the participant client device 340a may transmit a request, and in some cases the NFT associated with the virtual background, to the video conference provider 310. To verify that the participant client device 340a is associated with the virtual background, the video conference provider 310 may perform a search of a NFT registry. The NFT registry may include a participant profile in which virtual accessories associated with a client device are stored. The participant profile may also include a NFT associated with the virtual accessory. The NFT registry and the look-up process is described in greater detail with respect to FIGS. 5 and 6.

If the video conference provider 310 determines that the participant client device 340a is a registered device with authorization to use the virtual background, then the video conference provider 310 may "unlock" the virtual background for the participant client device 340a. Unlocking the virtual accessory may include providing the participant client device 340a permission to use the virtual accessory during a virtual meeting. For example, the video conference provider 310 may transmit a response to the participant client device 340a, such as an acceptance to the request to use the virtual background. The response may include authorization to use the virtual background.

If the video conference provider 310 determines that the participant client device 340a is not a registered device, then the video conference provider 310 may transmit a denial to the request to use for the virtual background to the participant client device 340a. In some embodiments, the video conference provider 310 may automatically select another virtual background for the participant client device 340a.

In some embodiments, the video conference provider 310 may determine that the participant client device 340a is not a registered device because the virtual background has not yet been registered with the video conference provider 310. In such cases, the participant client device 340a may not have a NFT associated with the virtual background. Instead, upon requesting to use the virtual background, the participant client device 340a may request or be prompted to register the virtual background. To register the virtual background, the video conference provider 310 may first determine whether there is a NFT associated with the virtual background. Determining whether there is a NFT associated with a virtual accessory may include processing metadata associated with the virtual accessory.

Upon determining that there is not a NFT associated with the virtual accessory, the video conference provider 310 may determine whether the requesting virtual accessory is a copy of an already registered virtual accessory. To make such a determination, the video conference provider 310 may analyze the virtual accessory for one or more identifiers. Identifiers may include visual features of a virtual accessory. Once the identifiers are determined, the video conference provider 310 may search the NFT registry for other virtual accessories that have similar identifiers. If the video conference provider 310 identifies another virtual accessory that has the same or substantially similar identifiers, then the video conference provider 310 may deny the request to register the requesting virtual accessory.

In some embodiments, to determine the similarity of a virtual accessory with another virtual accessory, a threshold number of identifiers must be met between the requesting virtual accessory and a registered virtual accessory. For example, if the video conference provider 310 determines that a requesting virtual accessory comprises 10 identifiers, then a similarity threshold with another virtual accessory may be 7-10 identifiers. That is, if the requesting virtual accessory has 7 of the same identifiers as an already registered virtual accessory, then the video conference provider 310 may determine that the requesting virtual accessory is a copy or a rip-off of an already registered virtual accessory. By not requiring an exact match between a requesting virtual accessory and a registered accessory, copies in which only a portion of a registered virtual accessory are used or simple modifications to a registered virtual accessory (such as changing a color scheme) can be prevented.

If the video conference provider 310 determines that the requesting virtual accessory is not the same or substantially similar to any registered virtual accessories, then the video conference provider 310 may begin a process to register the requesting virtual accessory. To initiate the registration process, the video conference provider 310 may generate a NFT and associate the NFT with the requesting virtual accessory. Both the NFT and the virtual accessory, including the identifiers, may then be registered in the NFT registry. The NFT registry may be hosted by the video conference provider 310 or may be hosted by a third party server. In some cases, the NFT registry may include a participant profile for each participant client devices 340a-m and host client device 330. The NFT and the virtual accessory may be registered in the NFT registry as part of the participant profile associated with the participant client device 340a.

In some embodiments, the NFT registry may include a blockchain. In such cases, the video conference provider 310 may register the NFT associated with the virtual accessory as a block in the blockchain. The NFT registry and blockchain processes are discussed in greater detail below with respect to FIGS. 5 and 6.

By registering the virtual accessory with the video conference provider 310, the participant client device 340a can prevent the other participant client devices 340b-m and the host client device 330 from using the virtual background. As described above, unless the participant client device is associated with the virtual accessory, determined by the NFT corresponding to the virtual accessory, then the participant client device is prevented from using the virtual accessory. While a participant client device can be associated with the virtual accessory, as described above, by registering the virtual accessory, in some embodiments, the participant client device may receive the virtual accessory from the registering participant client device. For example, the host client device 330 may register a virtual accessory with the video conference provider 310. The virtual accessory may be a filter that indicates that a participant is "Employee of the Month." Each month, the host client device 330 may bestow the Employee-of-the-Month filter to a different participant client device. For example, the host client device 330 may send the Employee-of-the-Month filter to the participant client device 340a. When the host client device 330 sends the Employee-of-the-Month filter to the participant client device 340a, the host client device 330 may also send a NFT associated with the filter to the participant client device 340a. In some cases, the NFT may be transmitted along with the Employee-of-the-Month filter to the participant client device 340a. In other embodiments, the host client device 330 may indicate to the NFT registry that the participant client device 340*a* has permission to use the Employee-of-the-Month filter. That is, the Employee-of-the-Month filter may be associated with the participant profile for the participant client device 340*a* within the NFT registry.

In some embodiments, the registered participant may set various settings for use of the virtual accessory. For example, such as the above Employee-of-the-Month filter example, the registered participant may set a time frame for when another participant can use the registered virtual accessory. Following the above Employee-of-the-Month filter, the host client device 330 may set a monthly time frame for when each receiving participant client device can use the Employee-of-the-Month filter. The settings for non-registered participants to use a registered virtual accessory are described in greater detail below with respect to FIG. 5.

Figure 4A:
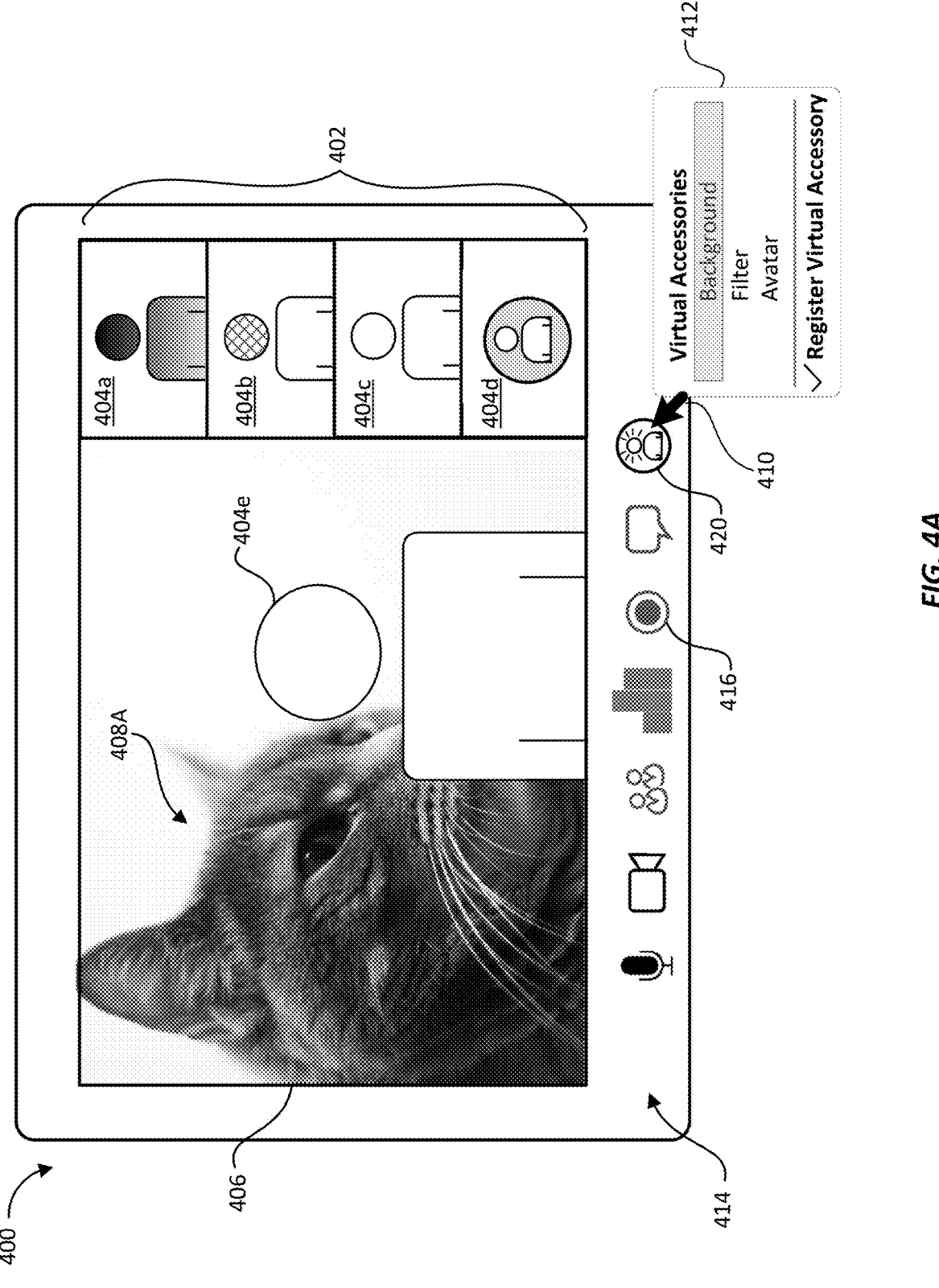
FIGS. 4A-C show a graphical user interface during a virtual meeting illustrating various virtual accessories, according to an embodiment herein.
Figure 4B:
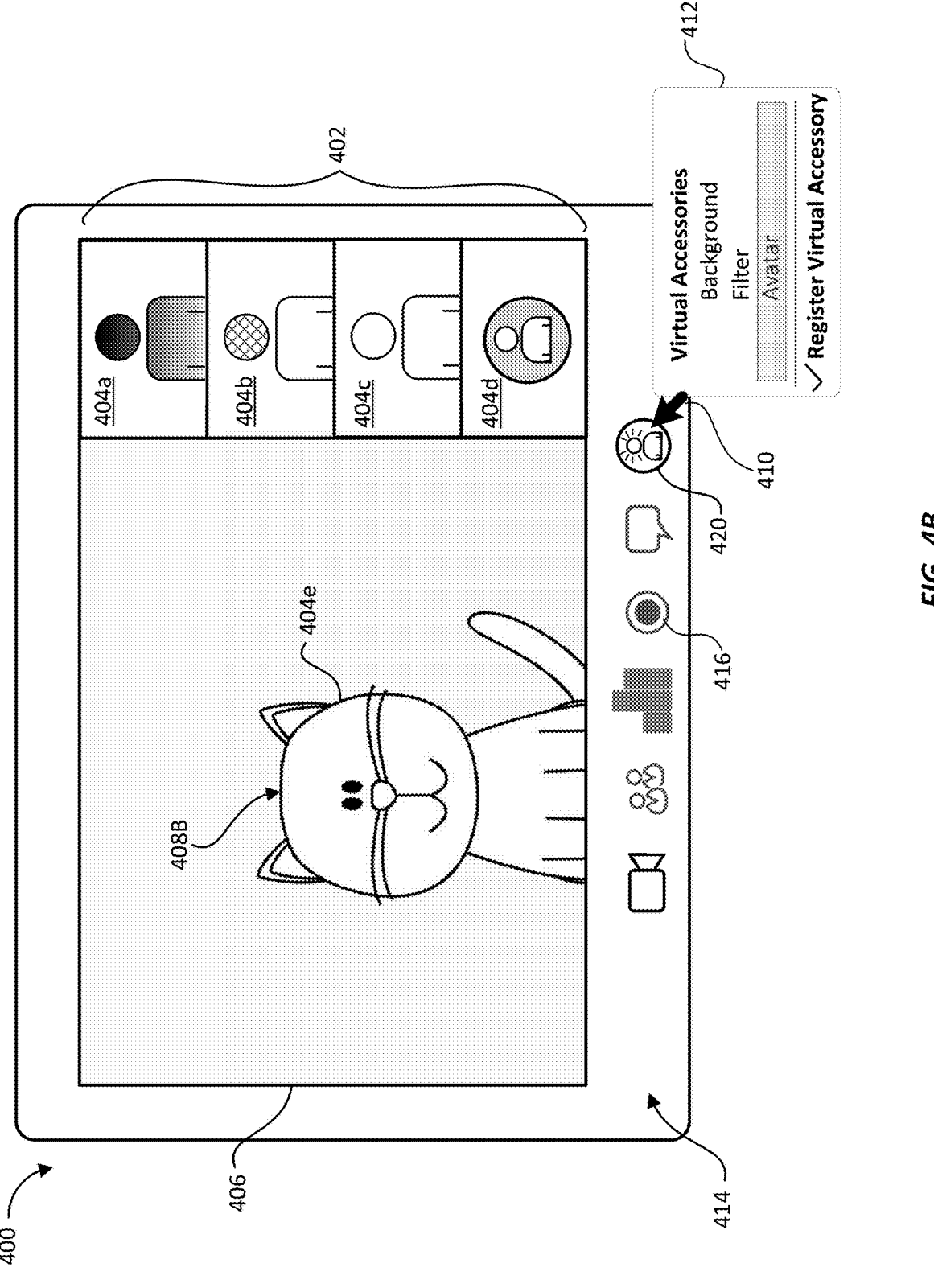
Figure 4C:
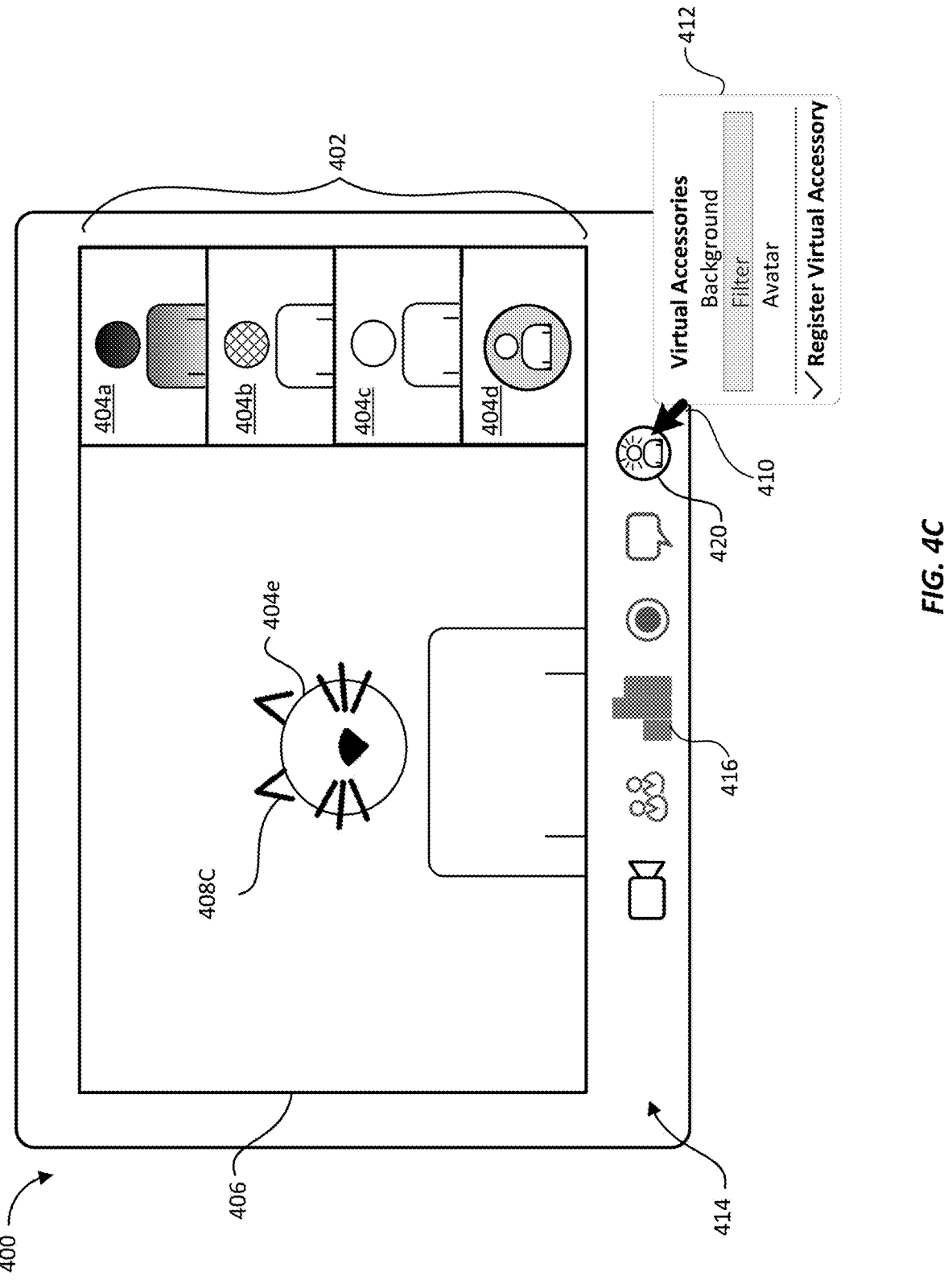

Once the video conference provider 310 determines that the participant client device 340*a* has permission to use the virtual background, then the participant client device 340*a* may use the virtual background during the virtual meeting. Referring now to FIGS. 4A-C, a graphical user interface (GUI) 400 during a virtual meeting illustrating various virtual accessories is provided, according to an embodiment herein. The GUI 400 may be presented to a participant or a host during a virtual meeting, such as the participant client device 340*a* or the host client device 330. The GUI 400 in each of FIGS. 4A-C may be the same GUI depicting different virtual accessories. The following figures and related components, such as GUI 400 of FIGS. 4A-C, will be described with respect to the system shown in FIG. 3, however, any suitable system according to this disclosure may be employed, such as those described in FIGS. 1 and 2.

In some embodiments, a GUI 400 is viewable to a participant of the video conference on the participant's device, for example the GUI 400 may be viewable to participant A on the client device 340*a*. Presentation of the GUI 400 on the participant's device may be in response to the initiation of the virtual meeting.

The GUI 400 may include a roster 402 of the participants 404*a-e* in the video conference. The roster 402 may include a video stream of some or all of the participants 404*a-e*. In other embodiments, the roster 402 may include a picture, image, representation, avatar or a listing of some or all of the participants 404*a-e* who have joined the virtual meeting. For example, as illustrated, the participant 404*a* may use a representation, the participant 404*b* may user an avatar, the participant 404*c* may use his or her video stream, and the participant 404*d* may use a picture on the roster 402. When a participant joins the video conference, the joining participant is added to the roster 402.

Once the virtual meeting is initiated, video and audio streams may be exchanged between the participants 404*a-e*. Display 406 may display the video stream of a currently speaking participant 404*e*. The audio stream from participant 404*e* may also be transmitted along with the video stream. In some embodiments, more than one participant may be speaking, and in such cases, the display 406 may include two or more windows providing the video streams from the speaking participants.

The GUI 400 may also include a dashboard 414 containing one or more action selections. For example, the dashboard 414 may include a recording selection 416 that allows a participant to record the streams of audio and video during the video conference. To initiate recording of the virtual meeting, a participant may select the recording selection 416. The recording selection 416 may transmit a recording request to the video conference provider 310, which may transmit a notification or request to the other meeting participants, as noted above. If the recording request is accepted, then the meeting may be recorded. Upon recording, an indication (not shown) may be provided to indicate to the participants 404*a-e* that they are being recorded. The indication may be helpful for the participants 404*a-e* to know that their audio and video streams are being recorded.

The dashboard 414 may also include a virtual accessory selection 420. The virtual accessory selection 420 may allow a participant to select or change virtual accessories before or during a virtual meeting. The virtual accessory selection 420 may also allow a participant to register a virtual accessory. To select or change virtual accessories, a participant may use cursor 410 to select the virtual accessory selection 420. Upon selection, a prompt 412 may be provided. The prompt 412 may include a listing of different virtual accessories that the participant can select. For example, as illustrated by the prompt 412, virtual accessories can include virtual backgrounds, virtual filters, avatars, and skins.

The GUI 400 on each of FIGS. 4A-C illustrates a different type of virtual accessory. For example, the GUI 400 on FIG. 4A depicts a virtual accessory that is a virtual background 408A. As illustrated, the participant 404*e* (the speaking participant) may have created the virtual background 408A. The virtual background 408A, as shown, includes an image of a black and white cat. The participant 404*e* may be a veterinary student and the cat depicted in the virtual background 408A may be the participant 404*e*'s favorite cat in the clinic. The virtual background 408A may be a personal expression of participant 404*e*'s work and as such, the participant 404*e* may want to be the only student in the veterinary lectures or other virtual meetings that uses the virtual background 408A. As such, the participant 404*e* may have registered the virtual background 408A using the systems and methods herein to prevent other meeting participants from using the virtual background 408A.

FIG. 4B illustrates another type of virtual accessory. For example, the GUI 400 on FIG. 4B depicts a virtual accessory that is an avatar 408B. In this example, the participant 404*e* selects to use an avatar 408B during the virtual meeting. The participant 404*e* may have created the avatar 408B to resemble his favorite cat in his clinic. Since the participant 404*e* created the avatar 408B, the participant 404*e* may want to prevent other meeting participants from using an avatar similar to the avatar 408B. As those skilled in the art will appreciate, the avatar 408B may be an animated or virtual body that mimics the movements, such as movement of the mouth during speaking, of the participant 404*e*. The avatar 408B may represent the participant 404*e* during the virtual meeting.

FIG. 4C illustrates yet another type of virtual accessory. In this example, the GUI 400 on FIG. 4C depicts a virtual accessory that is a filter 408C. The filter 408C may include virtual images that overlay on a video stream corresponding to the participant 404*e*. Here, the filter 408C is a cat filter that is positioned to overlay on the face of the participant 404*e*. The participant 404*e* may have designed the filter 408C after his favorite cat in the veterinary clinic and as such, the participant 404*e* may want to prevent other meeting participants from using the filter 408C.

To prevent other participants from using any one of the virtual background 408A, the avatar 408B, or the filter 408C the participant 404*e* may register the virtual accessory with the video conference provider 310. To register a virtual accessory, the participant 404*e* may select the option to Register Virtual Accessory on the prompt 412. Upon selection of the option to Register Virtual Accessory, the participant 404*e* may be provided with a prompt to set various preferences for the virtual accessory. These preferences may include allowing others to use the virtual accessory only when the participant 404e is not present in a meeting, allowing others to use the virtual accessory only for a certain period of time, allowing others to use the virtual accessory only if they are part of the same organization as the participant 404e, or preventing all usage by others of the virtual accessory in videoconference meetings provided by the video conference provider 110.

Figure 5:
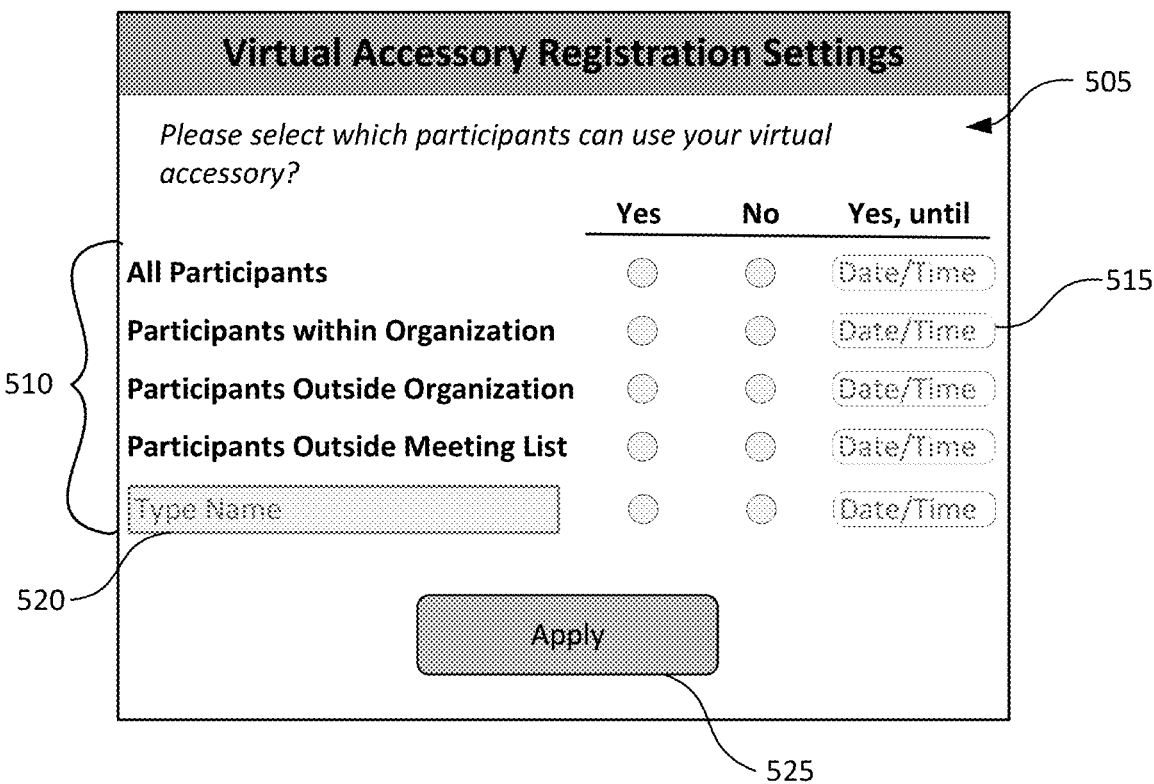
FIG. 5 illustrates an example virtual accessory registration settings prompt, according to an embodiment herein.

Referring now to FIG. 5, an example virtual accessory registration settings prompt 500 is provided, according to an embodiment herein. The following figures and related components, such as prompt 500 of FIG. 5, will be described with respect to the system shown in FIGS. 4A-C, however, any suitable system according to this disclosure may be employed, such as those described in FIGS. 1-3.

As shown, the prompt 500 may include various settings for registering the virtual accessory. For example, the prompt 500 may include a use settings 505 in which the participant 404e can set preferences for what other participants can use the virtual accessory and when the other participants can use the virtual accessory. The prompt 500 may include a listing 510 of various types of meeting participants. For example, the listing 510 may include an All Participants option, a Participants within Organization option, a Participants Outside Organization option, a Participants Outside Meeting List option, and an input field 520 for inputting specific participant's names or email addresses.

If the participant 404e wants to prevent any other participant from using the virtual accessory, the participant 404e may select "No" for all of the participant options on the listing 510. If, however, the participant 404e wants to allow all or some other participants to be able to use the virtual accessory, then the participant 404e can select "Yes" for the desired participant option. For example, if the participant 404e wants to allow all participants to use the virtual accessory, then the participant 404e may select "Yes" for the All Participants option on the listing 510, if the participant 404e wants to allow participants within his or her company/ organization to use the virtual accessory, then the participant 404e may select "Yes" for the Participants within Organization option on the listing 510, if the participant 404e wants to allow participants that are not within his or her company/ organization to use the virtual accessory, then the participant 404e may select "Yes" for the Participants Outside Organization option on the listing 510, and if the participant 404e wants to only allow participants who are not in the same meeting as him or her to use the virtual accessory, then the participant 404e may select "Yes" for Participants Outside Meeting List option on the listing 510. For the last scenario, the participant 404e may simply want to prevent other participants in the same meeting from using the same virtual accessory and as such may allow participants to use the virtual accessory so long as they are not in the same meeting as the participant 404e. The Participants Outside Meeting List option would accomplish this scenario.

If the participant 404e wanted to allow a specific participant to use the virtual accessory, then the participant 404e could input the specific participant's name or contact information into the input field 520 and select "Yes" for allowing use of the virtual accessory. For example, if the participant 404e was a manager and was bestowing a virtual accessory as an Employee-of-the-Month reward for the receiving participant, then the participant 404e may input the receiving participant's name into the input field 520. The participant 404e may also select a time frame or period 515 during which the receiving participant can use the virtual accessory.

For example, the participant 404e may set that the receiving participant for the Employee-of-the-Month virtual accessory can use the virtual accessory only during the month that the receiving participant received the award. Once the month is up, then the receiving participant may no longer have access or permission to use the virtual accessory.

Once the participant 404e sets his or her desired preferences for the Virtual Accessory Registration Settings, the participant 404e may select the apply option 525. Upon selection of the apply option 525, the video conference provider 310 may register the virtual accessory.

Figure 6:
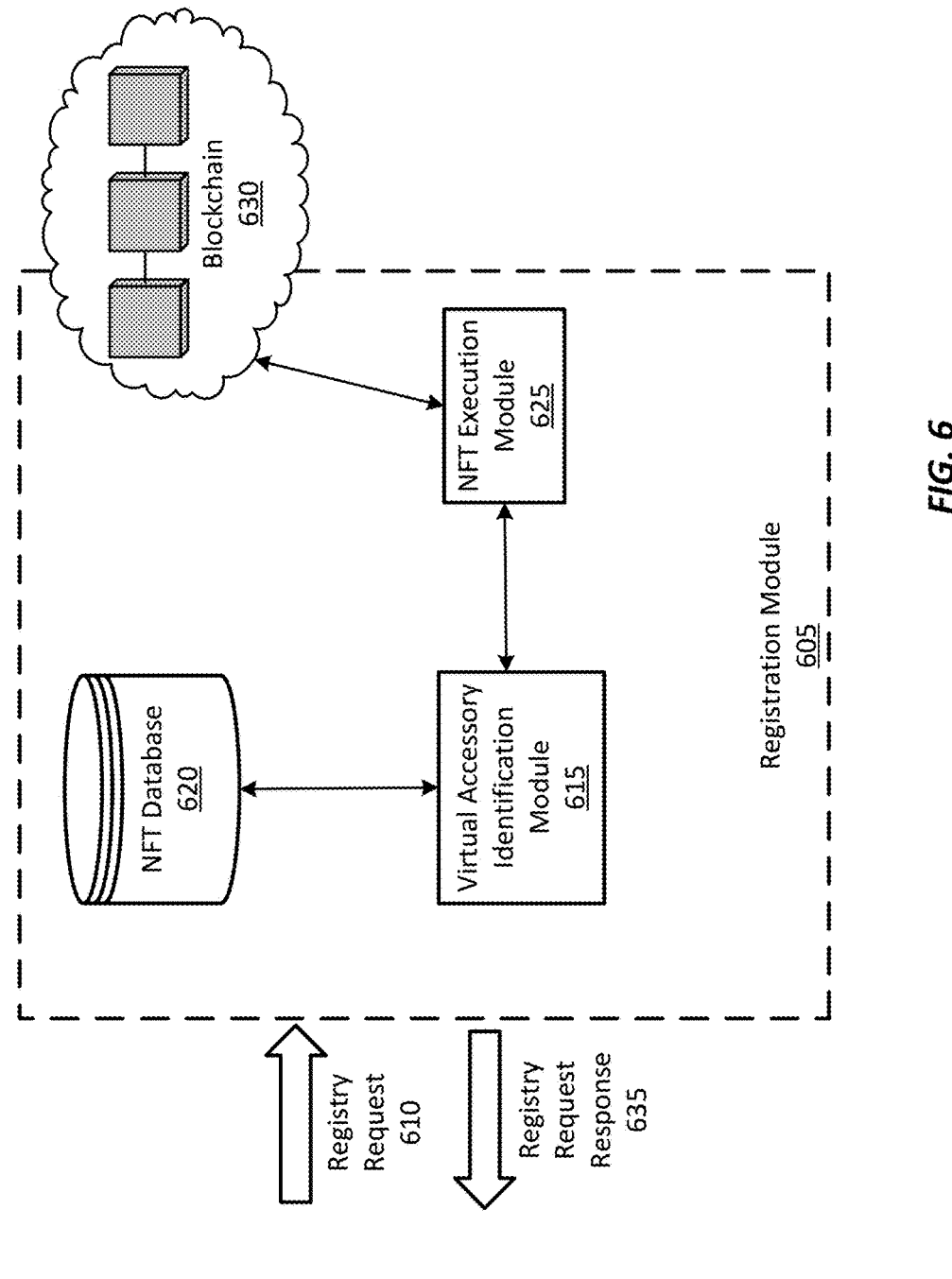
FIG. 6 illustrates an example NFT registry system, according to an embodiment herein.

Referring now to FIG. 6, an example NFT registry system 600 is provided, according to an embodiment herein. The following figures and related components, such as NFT registry system 600 of FIG. 6, will be described with respect to the systems shown in FIGS. 3 and 4A-C, however, any suitable system according to this disclosure may be employed, such as those described in FIGS. 1-2 and 5.

The NFT registry system 600 may be hosted by the video conference provider 310 or may be hosted on a third party server associated with the video conference provider 310. When a participant, such as the participant 404e makes a request 610 to register a virtual accessory, such as any one of the virtual background 408A, the avatar 408B, or the filter 408C, the NFT registry system 600 may receive the request 610 via a registration module 605. The registration module may include a virtual accessory identification module 615. The request 610 may first be processed by the virtual accessory identification module 615. The virtual accessory identification module 615 may process the registration request 610 to determine whether there is a NFT associated with the virtual accessory. That is, the virtual accessory identification module 615 may first process the virtual accessory associated with the request 610 to determine if there is a NFT associated with the virtual accessory. For example, there may be a NFT associated with the virtual accessory that is part of the virtual accessory metadata.

In another example, the virtual accessory identification module 615 may process the virtual accessory to identify one or more identifiers of the virtual accessory. For example, the virtual accessory identification module 615 may identify visual identifiers or other distinct features of the virtual accessory that are unique to that virtual accessory. Once the virtual accessory identification module 615 identifies the identifiers of the virtual accessory, the virtual accessory identification module 615 may query a NFT database 620 to determine whether the requesting virtual accessory is the same or substantially similar to other virtual accessories that are already registered. For example, the NFT registry system 600 may compare the identifiers of the requesting virtual accessory with the identifiers of registered virtual accessories. If the identifiers of the requesting virtual accessory match the identifiers of a registered virtual accessory beyond a threshold amount, then the NFT registry system, 600 may deny the request to register the virtual accessory. A threshold of matching identifiers between a requesting virtual accessory and a registered virtual accessory may be more than 50% matching, more than 60% matching, more than 70% matching, more than 80% matching, or more than 90% matching. As noted above, by having a matching threshold between identifiers of a requesting virtual accessory and a registered virtual accessory, knock-off virtual accessories can be prevented.

If the NFT registry system 600 determines that the requesting virtual accessory matches a recorded virtual accessory beyond the threshold amount, the NFT registry system 600 may prompt the participant 404e to indicate the match. In some embodiments, the NFT registry system 600 may determine, based on a participant profile, that the participant 404e is associated with the registered virtual accessory. In the case that the registered virtual accessory is registered to the participant 404e, then the NFT registry system 600 may allow the participant 404e to register the new virtual accessory, regardless of the similarity of the virtual accessories. If there is an exact match between a virtual accessory and a registered virtual accessory with the same registering participant 404e, the NFT registry system 600 may confirm with the participant 404e that the participant 404e didn't already register the requesting virtual accessory.

If there is an NFT associated with the virtual accessory (for example the virtual accessory is already registered to another participant), then the NFT registry system 600 may transmit a registry request response 635 to the participant 404e. In this case, the registry request response 635 may indicate that the virtual accessory is already registered to another participant or that the requesting virtual accessory is too similar to another registered virtual accessory, and thus the participant 404e cannot register the virtual accessory.

If the virtual accessory identification module 615 determines that there is not a NFT associated with the virtual accessory, then the virtual accessory identification module 615 may transmit the request 610 to the NFT execution module 625. At the NFT execution module 625, a NFT may be generated for the virtual accessory. Once the NFT is generated, the NFT execution module 625 may communicate with the NFT database 620 to register the NFT with the participant 404e and/or the participant client device associated with the participant 404e. The NFT may be registered in a participant profile for the participant 404e. One or more identifiers for the virtual accessory may also be registered in the participant profile or associated with the NFT to prevent others from registering a substantially similar or the same virtual accessory.

In some embodiments, the NFT may be added to a blockchain. In such examples, the NFT execution module 625 may communicate with a blockchain 630. The blockchain 630 may be maintained on one or more servers at the video conference provider 310 or the blockchain 630 may be maintained on one or more servers remote from the video conference provider 310. In an example embodiment, the blockchain 630 may be maintained on one or more participant client devices associated with the video conference provider 310. In another example, the blockchain 630 may be maintained on computing devices that are hosted by the video conference provider 310 or remote from the video conference provider 310.

To enter the NFT into the blockchain 630, a block for the NFT and the associated virtual accessory may be generated. The block may then be transmitted to every node (e.g., computing device) in the blockchain network. Once received, the nodes in the blockchain 630 may validate the block (e.g., the NFT) and enter the node into the existing blockchain. In some embodiments, the blockchain 630 may validate the NFT associated with the virtual accessory by verifying that the NFT does not already exist in the blockchain 630.

Once the NFT is entered into the blockchain 630, the blockchain 630 may communicate with the NFT execution module 625 that the registration of the NFT into the blockchain 630 is completed. The NFT execution module 625 may then communicate to the registration module 605 that the NFT is registered in the blockchain 630. Once the NFT is registered either in the NFT database 620 and/or in the blockchain 630, the NFT registry system 600 may transmit the registry request response 635 to the participant 404e confirming the registration.

Figure 7:
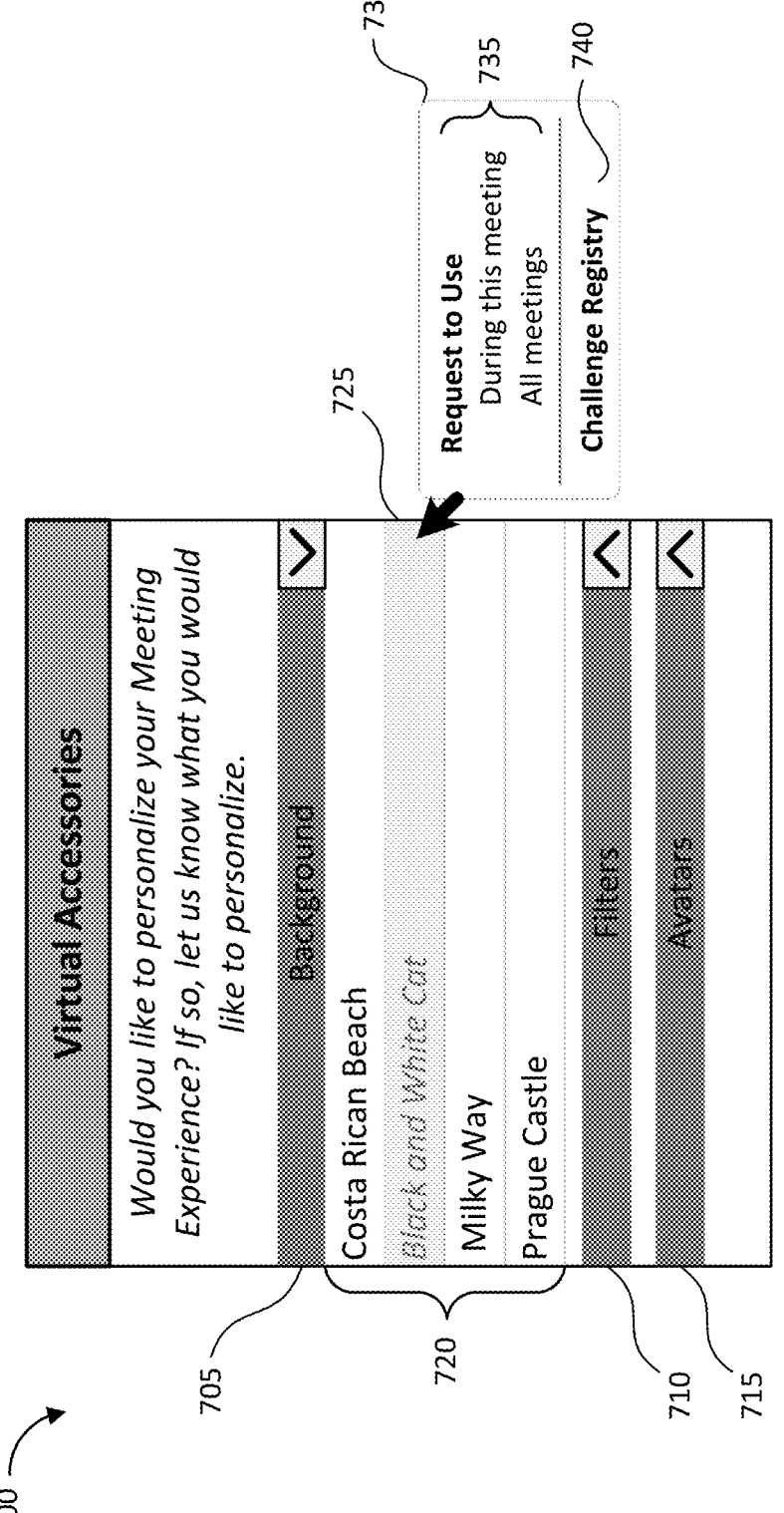
FIG. 7 illustrates an example virtual accessory prompt, according to an embodiment herein.

As noted above, once a virtual accessory is registered with the video conference provider 310, other participants who are not the registering participant may be unable to use the virtual accessory unless permission is granted. Referring now to FIG. 7, an example virtual accessory prompt 700 is provided, according to an embodiment herein. The following figures and related components, such as prompt 500 of FIG. 5, will be described with respect to the system shown in FIGS. 3 and 4A-C, however, any suitable system according to this disclosure may be employed, such as those described in FIGS. 1-2 and 5-6.

The virtual accessory prompt 700 may be provided to a participant prior to or during a virtual meeting when the participant wants to select a virtual accessory. For example, a participant can select the virtual accessory selection 420 and select a virtual accessory option from prompt 412. In some embodiments, when the participant selects a virtual accessory option on the prompt 412, the participant may be provided with the virtual accessory prompt 700. The virtual accessory prompt 700 may provide various choice for a given virtual accessory category from which the participant may choose. For example, as illustrated, the prompt 700 may include a virtual background category 705, a filter category 710, and an avatars category 715. If the participant wants to select a virtual background, the participant can select the virtual background category 705 and be provided with the various background options 720.

The background options 720 may indicate the availability of a virtual background to the requesting participant. For example, as illustrated, the virtual backgrounds for Costa Rican Beach, Milky Way, and Prague Castle are available for use. In contrast, the Black and White Cat background 725 is greyed out to indicate its unavailability. For example, the Black and White Cat background 725 may correspond to the virtual background 408A that is registered to the participant 404e. Since the requesting participant is not the participant 404e or using a device associated with the participant 404e, then the Black and White Cat background 725 is not available for use. In some configurations, only virtual accessories that the user of a device has previously selected/downloaded may be visible within the prompt (and thus a user will not see an exhaustive list of virtual accessories unavailable to the user due to being associated with a NFT). Alternatively, a user may be able to see a list of all virtual accessories unavailable to the user for research purposes.

In some embodiments, a participant may request to use an unavailable virtual background. For example, the participant may select the Black and White Cat background 725 and be provided with prompt 730. The prompt 730 may provide various options 735 for a use request. For example, the participant may request to use the Black and White Cat background 725 only during the present meeting or may request to use the Black and White Cat background 825 during all meetings. Other use options may be included on prompt 730.

If the participant is or believes that he or she is the owner of the Black and White Cat background 725, the participant may select the option to Challenge Registry 740. Once a Challenge Registry 740 is selected, the video conference provider 310 may perform an analysis of which participant has rights to the Black and White Cat background 725.

Once the participant selects a desired virtual accessory that is available, or receives permission to use a registered virtual accessory, the virtual accessory may be implemented on the participant's GUI 400. In one embodiment, the video conference provider 310 may transmit authorization to the participant client device 340*a* for use of the selected virtual accessory. In another embodiment, the video conference provider 310 may insert the virtual accessory into the video stream associated with the participant client device 340*a* when transmitting the video stream to the other participants in a virtual meeting. That is, the video conference provider 310 may receive the video stream from the participant client device 340*a* and insert the virtual accessory into the video stream prior to transmitting the augmented video stream to the participant client devices 340*b-m* and the host client device 330.

Figure 8:
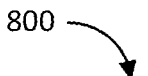
FIG. 8 illustrates an exemplary method for providing NFTs for virtual accessories during a virtual meeting, according to an embodiment herein.
Figure 8:
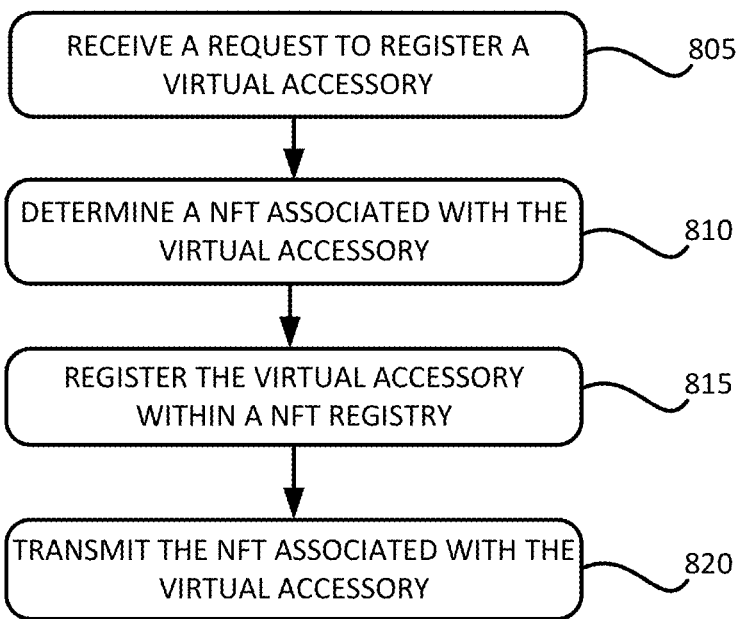

Referring now to FIG. 8, a flowchart of an example method 800 for providing NFTs for virtual accessories during a virtual meeting is provided. The description of the method 800 in FIG. 8 will be made with reference to FIGS. 3-7, however any suitable system according to this disclosure may be used, such as the example systems 100 and 200, shown in FIGS. 1 and 2.

The method 800 may include step 805. At step 805, the method 800 may include receiving, from a first client device, a request to register a virtual accessory with a video conference provider. For example, the participant client device 340*a* may request to register a virtual accessory, such as the virtual background 408A, the avatar 408B, or the filter 408C, with the video conference provider 310. Upon receiving the request, the video conference provider may determine a NFT associated with the virtual accessory, at step 810. For example, the video conference provider 310 may determine whether there is already an NFT associated with the virtual accessory based on identifiers of the virtual accessory or other information associated with the virtual accessory. In some embodiments, determining a NFT associated with the virtual accessory may include determining that there is no NFT associated with the virtual accessory and generating a NFT associated with the virtual accessory.

At step 815, the method 800 may include registering, by the video conference provider, the virtual accessory within a NFT registry. For example, the video conference provider 310 may register the virtual accessory within the NFT registry system 600. In some embodiments, the NFT registry system 600 may include a blockchain 630, and in such cases, the video conference provider 310 may register the NFT associated with the virtual accessory in the blockchain 630. That is, the video conference provider 310 may add the NFT associated with the virtual accessory to a blockchain ledger within the blockchain 630 of the NFT registry system 600. In some embodiments, step 815 may include determining one or more identifiers within the virtual accessory and registering the one or more identifiers associated with the virtual accessory within the NFT registry.

After the virtual accessory (or the NFT associated with the virtual accessory) is registered within the NFT registry, the video conference provider may transmit the NFT associated with the virtual accessory to the first client device, at step 820. In some embodiments, the NFT associated with the virtual accessory may be added to the participant's profile within the NFT registry system 600.

In further embodiments, the method 800 may include receiving, from a second client device, a request to register a second virtual accessory. Responsive to the request, the video conference provider may compare the second virtual accessory to the NFT registry. If the video conference provider determines that one or more identifiers associated with the second virtual accessory, upon comparison with the one or more identifiers within the NFT registry, are within a similarity threshold, then the video conference provider may deny registration of the second virtual accessory. In contrast, if the video conference provider determines that the second virtual accessory is not within a similarity threshold to any other virtual accessories within the NFT registry, then the video conference provider may authorize registration of the second virtual accessory.

In some embodiments, the method 800 may include receiving, from a second client device, a request to use the virtual accessory during a virtual meeting. The video conference provider may determine the NFT associated with the virtual accessory. Then the video conference provider may determine whether the requires is from a client device associated with the NFT within the blockchain ledger. If the video conference provider determines that the second client device is not the same as the client device associated with the NFT, then the video conference provider may make a determination to deny the second client device the request to use the virtual accessory. If the video conference provider determines that the second client device is the same as the client device associated with the NFT, then the video conference provider may determine to authorize the second client device to use the virtual accessory.

Figure 9:
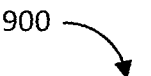
FIG. 9 illustrates an exemplary method for providing NFTs for virtual accessories during a virtual meeting, according to an embodiment herein.
Figure 9:
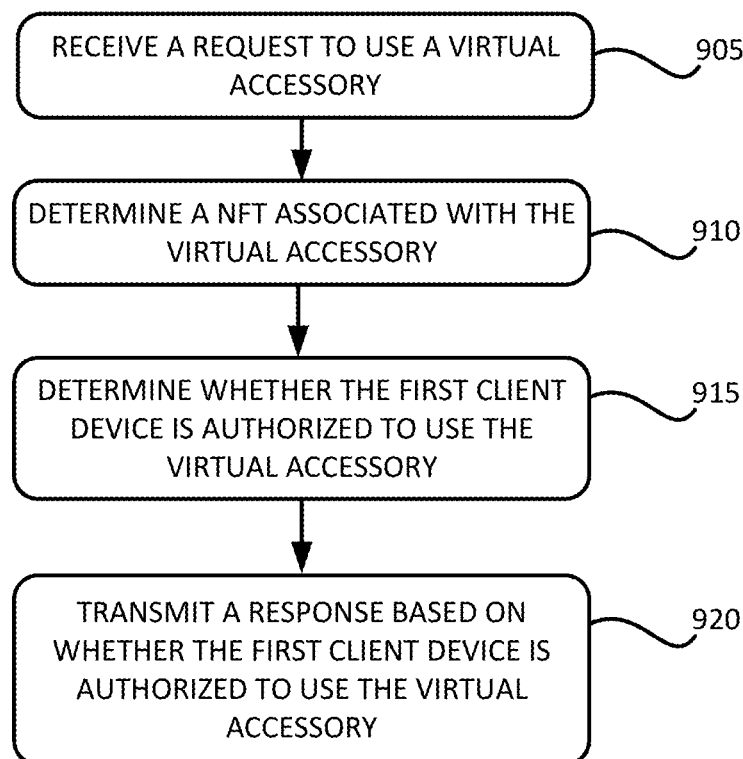

Referring now to FIG. 9, a flowchart of another example method 900 for providing NFTs for virtual accessories during a virtual meeting is provided. The description of the method 900 in FIG. 9 will be made with reference to FIGS. 3-8, however any suitable system according to this disclosure may be used, such as the example systems 100 and 200, shown in FIGS. 1 and 2.

The method 900 may include step 905. At step 905, the method may include receiving, from a first client device, a request to use a virtual accessory during a virtual meeting. For example, the participant client device 340*a* may transmit a request to the video conference provider 310 to use a virtual accessory, such as the virtual background 408A, the avatar 408B, or the filter 408C, during a virtual meeting.

At step 910, the method 900 may include determining, by the video conference provider, a NFT associated with the virtual accessory. For example, in some cases, the request to use the virtual accessory may include the NFT associated with the virtual accessory. In other embodiments, the video conference provider may determine the NFT associated with the virtual accessory by determining one or more identifiers within the virtual accessory and determining, via a NFT registry, the NFT associated with the virtual accessory based on the one or more identifiers.

At step 915, the method 900 may include determining, by the video conference provider, whether the first client device is authorized to use the virtual accessory based on the NFT. For example, if the video conference provider determines the NFT is associated with the virtual accessory via a NFT registry, then the video conference provider may determine whether the first client device is authorized to use the virtual accessory based on the NFT by determining, via the NFT registry, a client device associated with at least one of the NFT or the virtual accessory, and determine whether the first client device is the same as the client device. In some embodiments, the NFT registry may include a blockchain. In such cases, the method 900 may include querying the blockchain to determine the client device associated with the NFT.

In some embodiments, step 915 may include determining, via the NFT registry, one or more settings associated with the virtual accessory. Based on the one or more settings associated with the virtual accessory, the video conference provider may determine that the first client device is authorized to use the virtual accessory. The one or more settings associated with a virtual accessory may include use settings. For example, the virtual accessory may be available for use in a virtual meeting if the owner or originator of the virtual accessory is not present in the virtual meeting or the virtual accessory may be available for use after a certain date or within a set time frame. Other settings may include a value for use of the virtual accessory. For example, the virtual accessory may be available for use in exchange for $5. In such an example, the method may include determining, based on the one or more settings, a value associated with the use of the virtual meeting for non-first client devices (the first client device being the owner or originator of the virtual accessory). Upon determination of the value, the method may include transmitting a request for the value from the second client device. Then, upon receipt of the value from the second client device, the second client device may be provided with authorization to use the virtual accessory during the virtual meeting.

At step 920, the method 900 may include transmitting, by the video conference provider, a response based on whether the first client device is authorized to use the virtual accessory to the first client device. For example, if the video conference provider determines that the first client device is authorized to use the virtual accessory, then the response based on whether the first client device is authorized to use the virtual accessory may include authorization of the first client device to use the virtual accessory. In such cases, the method 900 may include transmitting, to the first client device the authorization to use the virtual accessory during the virtual meeting.

Figure 10:
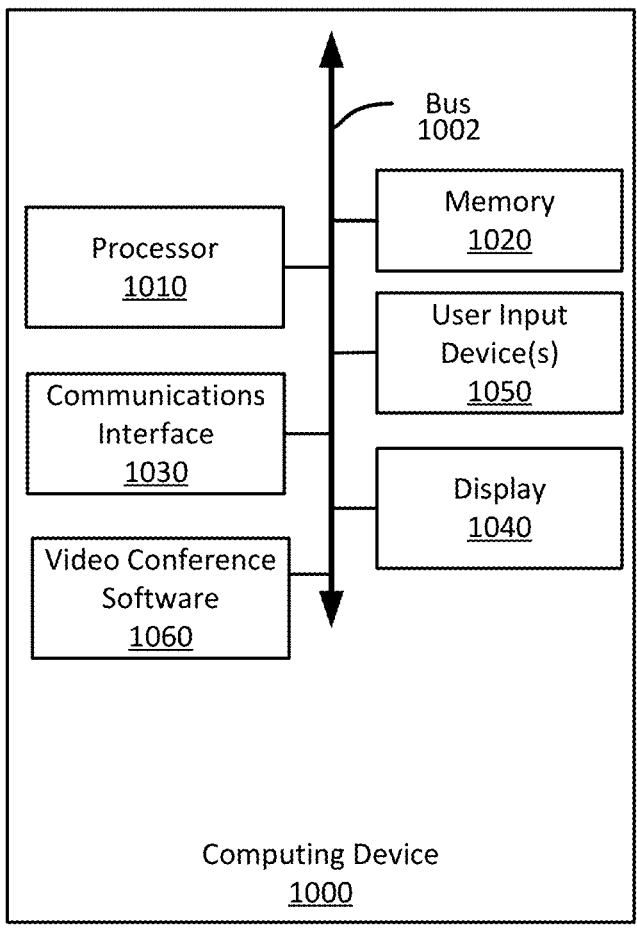
FIG. 10 shows an example computing device suitable for providing NFTs for virtual accessories during a virtual meeting, according to this disclosure.

Referring now to FIG. 10, FIG. 10 shows an example computing device 1000 suitable for use in example systems or methods for providing NFTs for virtual accessories during a virtual meeting. The example computing device 1000 includes a processor 1010 which is in communication with the memory 1020 and other components of the computing device 1000 using one or more communications buses 1002. The processor 1010 is configured to execute processor-executable instructions stored in the memory 1020 to perform one or more methods for providing NFTs for virtual accessories during a virtual meeting, such as part or all of the example methods 800 and 900, described above with respect to FIGS. 8 and 9, respectively. The computing device, in this example, also includes one or more user input devices 1050, such as a keyboard, mouse, touchscreen, video input device (e.g., one or more cameras), microphone, etc., to accept user input. The computing device 1000 also includes a display 1040 to provide visual output to a user.

The computing device 1000 also includes a communications interface 1030. In some examples, the communications interface 1030 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification As used below, any reference to a series of examples is to be understood as a reference to each of those examples disjunctively (e.g., "Examples 1-4" is to be understood as "Examples 1, 2, 3, or 4").

Example 1 is a system comprising: a non-transitory computer-readable medium; a communications interface; and a processor communicatively coupled to the non-transitory computer-readable medium and the communications interface, the processor configured to execute processor-executable instructions stored in the non-transitory computer-readable medium to: receive, from a first client device, a request to use a virtual accessory during a virtual meeting; determine a non-fungible token (NFT) associated with the virtual accessory; determine, based on the NFT, whether the first client device is authorized to use the virtual accessory; and transmit, to the first client device, a response based on whether the first client device is authorized to use the virtual accessory.

Example 2 is the system of any previous or subsequent Example, wherein the instructions to determine, based on the NFT, whether the first client device is authorized to use the virtual accessory further cause the processor to execute further processor-executable instructions stored in the non-transitory computer-readable medium to: determine, via a blockchain, whether the first client device is associated with the NFT.

Example 3 is the system of any previous or subsequent Example, wherein the instructions to determine, based on the NFT, whether the first client device is authorized to use the virtual accessory further cause the processor to execute further processor-executable instructions stored in the non-transitory computer-readable medium to: determine, via a NFT registry, that the first client device is associated with the NFT; and determine that the first client device is authorized to use the virtual accessory based on the association of the first client device with the NFT.

Example 4 is the system of any previous or subsequent Example, wherein the response comprises authorization to use the virtual accessory.

Example 5 is the system of any previous or subsequent Example, wherein the instructions to determine, via the NFT registry, that the first client device is associated with the NFT further cause the processor to execute further processor-executable instructions stored in the non-transitory computer-readable medium to: compare the NFT associated with the virtual accessory to one or more registered NFTs within the NFT registry to determine a client device associated with the virtual accessory; and determine that the client device associated with the virtual accessory is the first client device.

Example 6 is the system of any previous or subsequent Example, wherein: it is determined, via a NFT registry, that the first client device is not associated with the NFT; and the response comprises a denial to use the virtual accessory.

Example 7 is the system of any previous or subsequent Example, wherein the processor is further configured to execute further processor executable instructions stored in the non-transitory computer-readable medium to: select a second virtual accessory for the first client device; and transmit, to the first client device, an indication of permission to use the second virtual accessory.

Example 8 is a method comprising: receiving, from a first client device, a request to use a virtual accessory during a virtual meeting; determining, by a video conference provider, a non-fungible token (NFT) associated with the virtual accessory; determining, by the video conference provider, whether the first client device is authorized to use the virtual accessory based on the NFT; and transmitting, by the video conference provider, a response, based on whether the first client device is authorized to use the virtual accessory, to the first client device.

Example 9 is the method of any previous or subsequent Example, wherein the virtual accessory comprises at least one of: a virtual background; an avatar; or a virtual filter.

Example 10 is the method of any previous or subsequent Example, wherein determining the NFT associated with the virtual accessory further comprises: determining one or more identifiers within the virtual accessory; and determining, via a NFT registry, the NFT associated with the virtual accessory based on the one or more identifiers.

Example 11 is the method of any previous or subsequent Example, wherein: the NFT associated with the virtual accessory is determined via a NFT registry; and determining whether the first client device is authorized to use the virtual accessory based on the NFT further comprises: determining, via the NFT registry, a client device associated with at least one of the NFT or the virtual accessory; and determining whether the first client device is the same as the client device.

Example 12 is the method of any previous or subsequent Example, wherein the NFT registry comprises a blockchain and the method further comprises: querying the blockchain to determine the client device associated with the NFT.

Example 13 is the method of any previous or subsequent Example, wherein determining whether the first client device is authorized to use the virtual accessory based on the NFT further comprises: determining, via a NFT registry, one or more settings associated with the virtual accessory; and determining, based on the one or more settings associated with the virtual accessory that the first client device is authorized to use the virtual accessory.

Example 14 is the method of any previous or subsequent Example, wherein: the video conference provider determines that the first client device is authorized to use the virtual accessory; and the response comprises authorization of the first client device to use the virtual accessory.

Example 15 is a non-transitory computer-readable medium comprising processor-executable instructions configured to cause one or more processors to: receive, from a first client device, a request to use a virtual accessory during a virtual meeting; determine a non-fungible token (NFT) associated with the virtual accessory; determine, based on the NFT, whether the first client device is authorized to use the virtual accessory; and transmit, to the first client device, a response based on whether the first client device is authorized to use the virtual accessory.

Example 16 is the non-transitory computer-readable medium of any previous or subsequent Example, wherein the instructions to determine, based on the NFT, whether the first client device is authorized to use the virtual accessory further causes the processor to execute further processor-executable instructions stored in the non-transitory computer-readable medium to: determine, via a NFT registry, client device associated with at least one of the NFT or the virtual accessory.

Example 17 is the non-transitory computer-readable medium of any previous or subsequent Example, wherein the instructions to determine, based on the NFT, whether the first client device is authorized to use the virtual accessory further causes the processor to execute further processor-executable instructions stored in the non-transitory computer-readable medium to: determine, one or more settings associated with the virtual accessory within the NFT registry; and determine, based on the one or more settings, to allow the first client device to use the virtual accessory during the virtual meeting.

Example 18 is the non-transitory computer-readable medium of any previous or subsequent Example, wherein the instructions to determine, based on the one or more settings, to allow the first client device to use the virtual accessory during the virtual meeting further causes the processor to execute further processor-executable instructions stored in the non-transitory computer-readable medium to: determine, via the NFT registry, a second client device associated with the NFT; determine, based on the one or more settings, a lack of association of the second client device with the virtual meeting, wherein the one or more settings allow use of the virtual accessory in virtual meetings that are not associated with the second client device; and transmit, to the first client device, permission to use the virtual accessory during the virtual meeting.

Example 19 is the non-transitory computer-readable medium of any previous or subsequent Example, wherein the instructions to determine, based on the one or more settings, to allow the first client device to use the virtual accessory during the virtual meeting further causes the processor to execute further processor-executable instructions stored in the non-transitory computer-readable medium to: determine, based on the one or more settings, a value associated with use of the virtual meeting for non-second client devices; transmit, to the first client device, a request for the value to use the virtual meeting; and receive, from the first client device, the value to use the virtual meeting.

Example 20 is the non-transitory computer-readable medium of any previous or subsequent Example, wherein the virtual accessory comprises at least one of: a virtual background; an avatar; or a virtual filter.

That which is claimed is:

1. A system comprising:
a non-transitory computer-readable medium;
a communications interface; and
a processor communicatively coupled to the non-transitory computer-readable medium and the communications interface, the processor configured to execute processor-executable instructions stored in the non-transitory computer-readable medium to:
receive, from a first client device, a request to use a virtual accessory during a video conference;
determine a non-fungible token (NFT) associated with the virtual accessory;

determine, based on the NFT, whether the first client device is authorized to use the virtual accessory;
determine a sharing status of the virtual accessory based on the NFT; and
transmit, to the first client device, a response based on whether the first client device is authorized to use the virtual accessory.

2. The system of claim 1, wherein the instructions to determine, based on the NFT, whether the first client device is authorized to use the virtual accessory further cause the processor to execute further processor-executable instructions stored in the non-transitory computer-readable medium to:
determine, via a blockchain, whether the first client device is associated with the NFT.

3. The system of claim 1, wherein the instructions to determine, based on the NFT, whether the first client device is authorized to use the virtual accessory further cause the processor to execute further processor-executable instructions stored in the non-transitory computer-readable medium to:
determine, via a NFT registry, that the first client device is associated with the NFT; and
determine that the first client device is authorized to use the virtual accessory based on the association of the first client device with the NFT.

4. The system of claim 3, wherein the response comprises authorization to use the virtual accessory.

5. The system of claim 3, wherein the instructions to determine, via the NFT registry, that the first client device is associated with the NFT further cause the processor to execute further processor-executable instructions stored in the non-transitory computer-readable medium to:
compare the NFT associated with the virtual accessory to one or more registered NFTs within the NFT registry to determine a client device associated with the virtual accessory; and
determine that the client device associated with the virtual accessory is the first client device.

6. The system of claim 1, wherein:
it is determined, via a NFT registry, that the first client device is not associated with the NFT;
wherein the processor is further configured to execute further processor executable instructions stored in the non-transitory computer-readable medium to determine that the sharing status indicates that the virtual accessory has not been shared with a user associated with the first client device; and
wherein the response comprises a denial to use the virtual accessory.

7. The system of claim 4, wherein the processor is further configured to execute further processor executable instructions stored in the non-transitory computer-readable medium to:
select a second virtual accessory for the first client device; and
transmit, to the first client device, an indication of permission to use the second virtual accessory.

8. A method comprising:
receiving, from a first client device, a request to use a virtual accessory during a video conference;
determining, by a video conference provider, a non-fungible token (NFT) associated with the virtual accessory;
determining, by the video conference provider, whether the first client device is authorized to use the virtual accessory based on the NFT;

determine a sharing status of the virtual accessory based on the NFT; and transmitting, by the video conference provider, a response, based on whether the first client device is authorized to use the virtual accessory, to the first client device.

9. The method of claim 8, wherein the virtual accessory comprises at least one of:

a virtual background;

an avatar; or a virtual filter.

10. The method of claim 8, wherein determining the NFT associated with the virtual accessory further comprises:

determining one or more identifiers within the virtual accessory; and determining, via a NFT registry, the NFT associated with the virtual accessory based on the one or more identifiers.

11. The method of claim 8, wherein:

the NFT associated with the virtual accessory is determined via a NFT registry; and determining whether the first client device is authorized to use the virtual accessory based on the NFT further comprises:

determining, via the NFT registry, a client device associated with at least one of the NFT or the virtual accessory; and determining whether the first client device is the same as the client device.

12. The method of claim 11, wherein the NFT registry comprises a blockchain and the method further comprises:

querying the blockchain to determine the client device associated with the NFT.

13. The method of claim 8, wherein determining whether the first client device is authorized to use the virtual accessory based on the NFT further comprises:

determining, via a NFT registry, one or more settings associated with the virtual accessory; and determining, based on the one or more settings associated with the virtual accessory that the first client device is authorized to use the virtual accessory.

14. The method of claim 8, wherein:

the video conference provider determines that the first client device is authorized to use the virtual accessory based on the sharing status; and the response comprises authorization of the first client device to use the virtual accessory.

15. A non-transitory computer-readable medium comprising processor-executable instructions configured to cause one or more processors to:

receive, from a first client device, a request to use a virtual accessory during a video conference;

determine a non-fungible token (NFT) associated with the virtual accessory;

determine, based on the NFT, whether the first client device is authorized to use the virtual accessory;

determine a sharing status of the virtual accessory based on the NFT; and transmit, to the first client device, a response based on whether the first client device is authorized to use the virtual accessory.

16. The non-transitory computer-readable medium of claim 15, wherein the instructions to determine, based on the NFT, whether the first client device is authorized to use the virtual accessory further causes the processor to execute further processor-executable instructions stored in the non-transitory computer-readable medium to:

determine, via a NFT registry, client device associated with at least one of the NFT or the virtual accessory.

17. The non-transitory computer-readable medium of claim 16, further comprising processor-executable instructions configured to cause the one or more processors to:

determine, based on the sharing status, to allow the first client device to use the virtual accessory during the video conference.

18. The non-transitory computer-readable medium of claim 17, further comprising processor-executable instructions configured to cause the one or more processors to:

determine, via the NFT registry, a second client device associated with the NFT;

determine, based on the sharing status, a lack of association of the second client device with the video conference, wherein the sharing status allow use of the virtual accessory in video conferences that are not associated with the second client device; and transmit, to the first client device, permission to use the virtual accessory during the video conference.

19. The non-transitory computer-readable medium of claim 17, further comprising processor-executable instructions configured to cause the one or more processors to:

determine, based on the sharing status, a value associated with use of the video conference for non-second client devices;

transmit, to the first client device, a request for the value to use the virtual accessory during the video conference; and receive, from the first client device, the value to use the virtual accessory during the video conference.

20. The non-transitory computer-readable medium of claim 15, wherein the virtual accessory comprises at least one of:

a virtual background;

an avatar; or a virtual filter.

* * * * *